United States Patent

Seminatore et al.

[15] 3,701,954

[45] Oct. 31, 1972

[54] ADJUSTABLE PULSE TRAIN GENERATOR

[72] Inventors: Albert F. Seminatore, San Jose; Steven R. Bryan, Campbell, both of Calif.

[73] Assignee: The United States of America as represented by the Secretary of the Navy

[22] Filed: July 7, 1971

[21] Appl. No.: 160,381

[52] U.S. Cl. ....................328/59, 307/227, 307/228, 307/235, 307/260, 328/60, 328/186

[51] Int. Cl. ............................H03k 1/00, H03k 5/00

[58] Field of Search......307/227, 228, 234, 235, 260, 307/265; 328/59, 60, 146–149, 150, 186

[56] References Cited

UNITED STATES PATENTS

| | | | |
|---|---|---|---|
| 3,244,989 | 4/1966 | Carlson | 307/235 X |
| 3,317,743 | 5/1967 | Rogers | 307/227 X |
| 3,344,285 | 9/1967 | Frye | 307/235 X |
| 3,601,708 | 8/1971 | Stempler et al. | 307/235 X |
| 3,612,975 | 10/1971 | Keefe | 328/150 X |
| 3,014,181 | 12/1961 | Filipowsky | 328/59 X |
| 3,226,577 | 12/1965 | Azuma et al | 307/234 |

*Primary Examiner*—Stanley D. Miller, Jr.
*Attorney*—Richard S. Sciascia et al.

[57] ABSTRACT

A compact simplified pulse generator for generating a train of accurately timed pulses. The timing or spacing between pulses can be adjusted as desired. This is accomplished using a single comparator and a single monostable multivibrator with a digitally controlled reference voltage generator.

3 Claims, 6 Drawing Figures

INVENTORS
ALBERT F. SEMINATORE
STEVEN R. BRYAN
BY John F. Miller AGENT
ATTORNEY

INVENTORS
ALBERT F. SEMINATORE
STEVEN R. BRYAN
BY John F. Miller AGENT

ATTORNEY

INVENTORS
ALBERT F. SEMINATORE
STEVEN R. BRYAN

BY John F. Miller AGENT

ATTORNEY

ADJUSTABLE PULSE TRAIN GENERATOR

BACKGROUND OF THE INVENTION

The invention is in the field of pulse generators, more particularly generators of variably spaced pulses.

In the prior art one type of circuit used for generating a pulse which must occur at a particular time is comprised of a comparator which develops an output voltage to activate a monostable multivibrator, the output of which is the desired pulse. Such circuits using a single monostable multivibrator require a complex gate logic circuit ahead of the multivibrator if more than one pulse is required. This gate logic circuitry requires many duplicate components, such as a comparator and associated circuitry for each respective output pulse desired. The invention overcomes this and other deficiencies of the prior art by using a single comparator and monostable multivibrator in conjunction with a counter controlled biasing circuit to generate a pulse train comprising a number of pulses occuring at selected times.

SUMMARY OF THE INVENTION

The invention is a circuit for generating a series of pulses of uniform width which occur at selected times. The times of occurrence, that is the spacing between pulses, can be varied as desired. The invention uses a single comparator which compares a ramp voltage and a variable reference voltage to generate a comparator output voltage spike which activates a single monostable multivibrator. The output of the monostable multivibrator is the desired pulse. The multivibrator output pulse is also used to clock a counter which controls logic and biasing circuits to bias an amplifier which supplies the reference voltage to one input of the comparator.

DESCRIPTION OF THE PREFERRED EMBODIMENT

Figure 1:
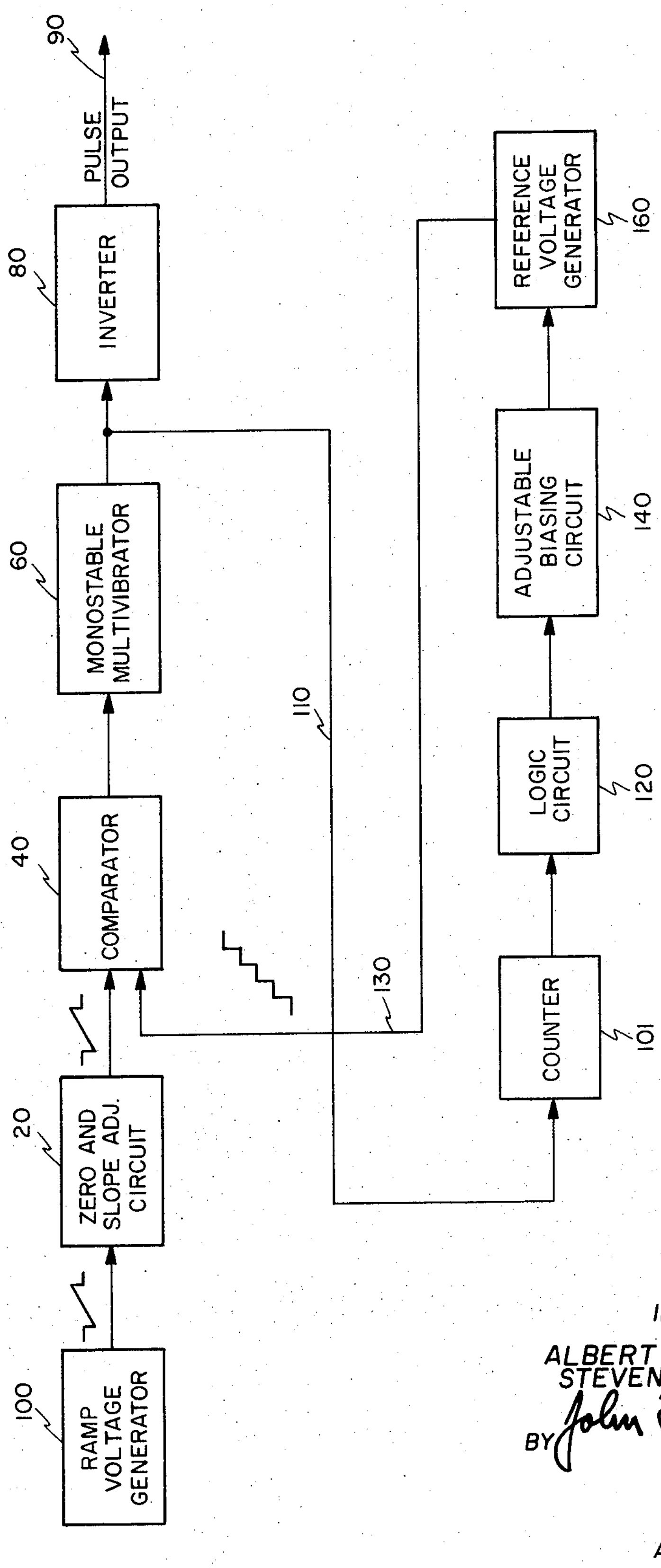
FIG. 1 is a block diagram of the invention.
Figure 2A:
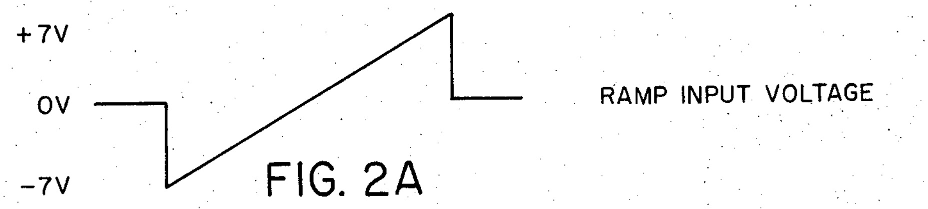
FIG. 2A to 2D shows certain voltage waveforms generated by the invention.
Figure 2B:
Figure 2C:
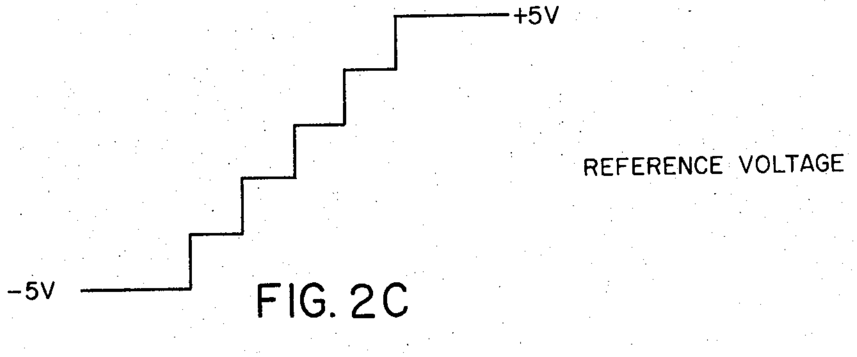
Figure 2D:
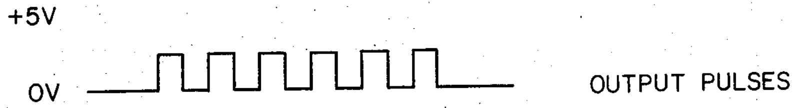

FIG. 1 is a block diagram of the invention. In FIG. 1, a ramp voltage generator 100 develops a ramp shaped voltage waveform which is applied to a zero and slope adjusting circuit 20. Circuit 20 is adjustable to position the positive and negative excursions of the ramp voltage with respect to zero and to adjust the slope of the ramp. See curve A of FIG. 2. The output voltage of circuit 20 in the form of a corrected ramp is applied to one input of a comparator 40. A reference voltage from a reference voltage generator 160 is applied to a second input of comparator 40. Comparison of the two voltages, one a ramp shape and the other a modified staircase voltage, results in a series of output voltage signals from comparator 40. The comparator 40 is reset by the subsequent positive transition in the reference staircase voltage. The output signals from comparator 40 are applied to a monostable multivibrator 60 which in response thereto generates a series of shaped pulses of uniform duration and selectively variable spacing. The output of 60 passes through an inverter 80 which may also function as a driver to form the system output on an output lead 90.

The output pulses from monostable multivibrator 60 are furnished over a line 110 to clock a counter 101. Counter 101 develops output voltages in accordance with the count stored therein which control a logic circuit 120 which in turn controls an adjustable biasing circuit 140. Circuit 140 controls a reference voltage generator 160 which generates a modified staircase reference voltage which is applied to the second input of comparator 40 over a line 130.

The staircase reference voltage can be varied by adjusting biasing circuit 140. This varies the spacing of the system output pulses on line 90.

In FIG. 2, curve A shows the shape of the ramp voltage generated by ramp voltage generator 100. Curve B shows the output waveshape of monostable multivibrator 60. Curve C shows the shape of the staircase reference voltage generated by 160. Curve D shows the output pulses of the system on line 90.

Figure 3:
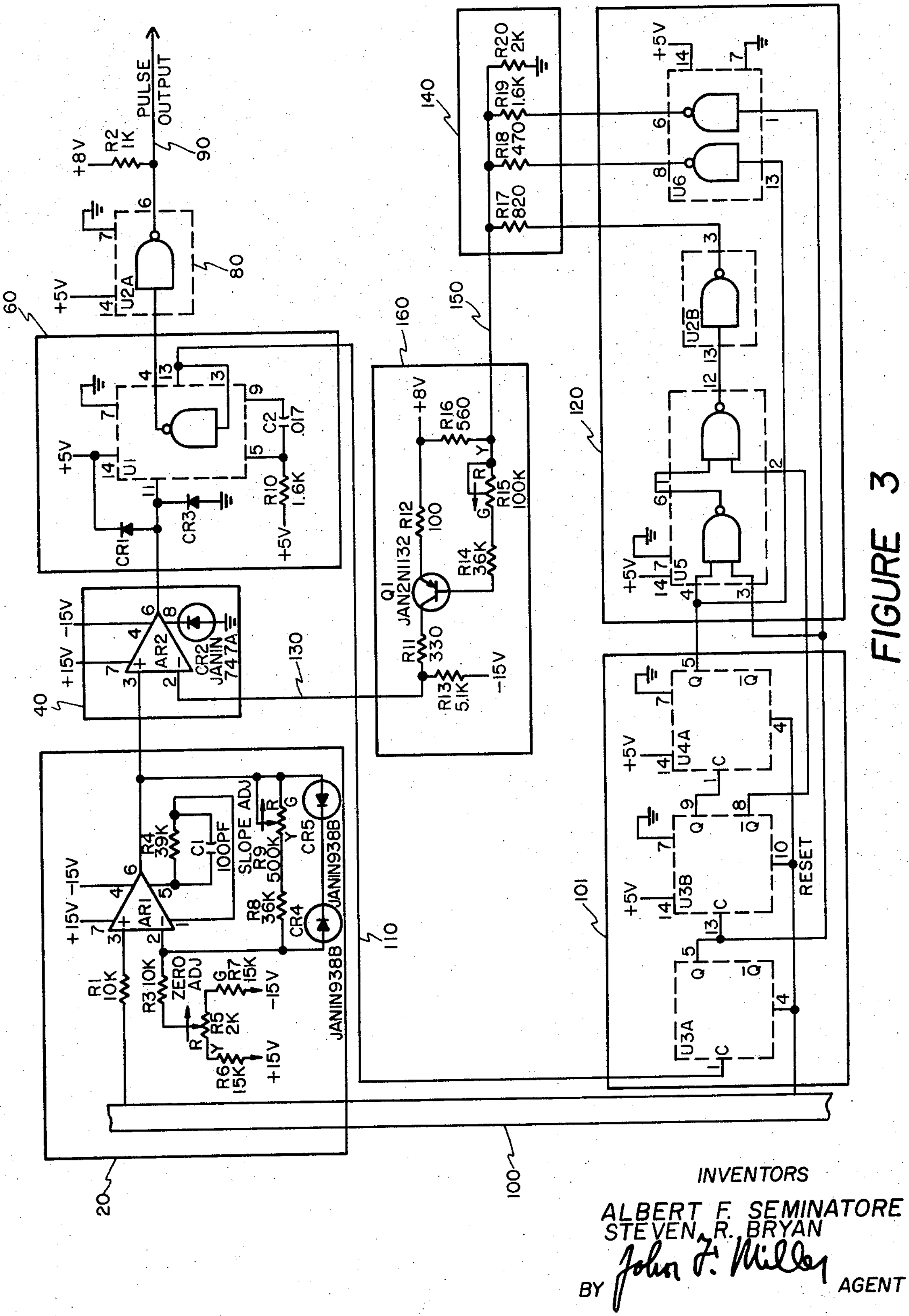
FIG. 3 is a circuit schematic of the invention.

FIG. 3 is a schematic of one circuit for implementing the invention. Ramp voltage generator 100 may be a prior art generator, usually a part of other equipment with which the invention is synchronized. Zero and slope adjustment circuit 20 is comprised of a differential amplifier AR1 having zero and slope adjustments provided by potentiometers R5 and R9 respectively. Comparator 40 is comprised of a differential amplifier AR2 having a positive input terminal connected to the output of AR1 and having a negative input terminal connected to receive the staircase reference voltage from 160 over line 130. Monostable multivibrator 60 and inverter 80 are comprised of integrated circuit chips U1 and U2A respectively. Inverter 80 inverts the output pulses from 60 to form the system output pulses on output lead 90.

Counter 101 is comprised of three cascaded JK type flip-flops. In the embodiment of the invention shown the counting capacity of counter 101 is reduced to six in a known manner, since only six output pulses are desired in this particular application. This may be accomplished by a reset pulse on the line shown connected to pins 4, 10, and 4 of U3A, U3B, and U4A, respectively, or by known feedback techniques.

Logic circuit 120 is comprised of three integrated circuits U5, U2B, and U6 connected as shown. Three output leads from 120 lead to three resistors R17, R18, and R19 which with R20 comprise the adjustable biasing circuit 140. These resistors have a common connection to a line 150 which is connected through resistors R14 and R15 to the base of a transistor Q1 which comprises reference voltage generator 160.

As indicated by FIG. 3, pulses from monostable multivibrator 60 are sent over line 110 to the clock input of the first flipflop U3A of counter 101 to step the counter in a known manner. As the count in the counter advances the states of the flipflop Q and $\overline{Q}$ output terminals change to change the output of the NANDS and the NOT function gate drivers of logic circuit 120 which are connected to resistors R17, R18, and R19. As the outputs of U2B and U6 vary between logical "1s"and "0s", the bias on Q1 is varied. This affects the conduction of Q1, causing the voltage at the negative input terminal of AR2 to vary in the staircase increments shown in curve C of FIG. 2. When the reference staircase voltage is increased to the next positive transition, the comparator 40 is reset to a normal state. Comparison of these staircase increments with the ramp voltage from 20 results in a comparator output signal causing monostable 60 to develop the system output pulses.

The invention has utility in any application requiring a plurality of accurately spaced pulses, for example for radar rangemarking. Numerous other applications will be apparent to those skilled in the art. Pulse spacing can be varied by substituting different valued resistors in adjustable biasing circuit 140, as by using potentiometers rather than fixed resistors. Extremely narrow output pulses can be provided by using the comparator 40 output signal directly, which essentially eliminates the multivibrator 60. The comparator output voltage spike width is directly related to the inherent propagation delay of the counter 101 and logic circuit 120, adjustable biasing circuit 140, and reference voltage generator 160. Obviously the radix of counter 101 as well as the counter output connections and/or logic circuit 120 can be varied as desired to obtain any desired sequence of variably spaced pulses. As shown, the first NAND gate of chip U5 in logic circuit 120 has inputs from the Q output terminals of counter flipflops U3A and U4A, while the second NAND gate derives its two inputs from the first NAND gate and the $\overline{Q}$ output of flipflop U3B. Changing this logic could obviously change the reference voltage and system output. The adjustments available to the counter, the logic circuit, and the biasing circuit make the range of adjustment of the system output practically limitless.

The integrated circuits shown are commercially available modules. The elements AR1 and AR2 are National Semiconductor Co. Number LM201 amplifiers. The elements U3A, U3B, and U4A are Steward Warner JK type flipflops Number 705–25. The element U1 is a Steward Warner JK type flipflops Number 728–25 modified to be monostable by resistor R10 and capacitor C2 shown connected to pins 5 and 9. It should be noted that the output of U1 on pin 13 goes directly to the clock input of flip-flop U3A which requires a negative going voltage. The pulse on pin 13 is brought back in to the NOT circuit shown in U1, amplified, and sent out on pin 4 to be reinverted by inverter-driver U2A to form the system output pulses.

The elements U6, U2B, and U2A are Stewart Warner Number 944-2P modules. U5 is a Stewart Warner Number 963–25. Resistor and capacitor values (in ohms and microfarads), voltages, and rectifier and transistor type numbers are shown so that a person skilled in the art can readily make the invention. Additionally, the manufacturer's pin or connector numbers are shown adjacent the connections to the several elements.

It should be understood that the embodiment of FIG. 3 is shown by way of example only. The invention can be implemented using many other components, for example tubes, and in many other configurations using the basic principles of the invention disclosed.

What is claimed is:

1. In a pulse generator circuit having an electrical signal supplied as an input thereto that is employed for generating a pulse train, the improvement comprising:

a ramp voltage generator, a comparator for comparing two voltages, a variable reference voltage generator for generating a variable reference voltage, connecting means connecting the outputs of said ramp voltage generator and said variable reference voltage generator to respective inputs of said comparator to develop a comparator output voltage pulse train, adjusting means responsive to said comparator output voltage to adjust said variable reference voltage generator to vary said reference voltage, a ramp voltage zero and slope adjustment means for positioning and shaping said ramp voltage to enhance the accuracy of said pulse train, a monostable multivibrator connected to the output terminal of said comparator for quantizing the pulses of said pulse train, and inverter means for inverting a pulse train output from said monostable multivibrator.

2. The apparatus of claim 1, said adjusting means including:

an adjustable biasing circuit, means connecting said adjustable biasing circuit to said reference voltage generator to bias said reference voltage generator in accordance with the adjustment of said biasing circuit to vary the pulse spacing of said pulse train.

3. The apparatus of claim 2, said adjusting means including:

a logic circuit connected to control said adjustable biasing circuit, a counter connected to control said logic circuit, and means connecting an output terminal of said monostable multivibrator to the input of said counter, whereby the pulse train output of said monostable multivibrator is stored in said counter to control said logic circuit.

* * * * *